United States Patent [19]

Casadio

[11] 4,366,730
[45] Jan. 4, 1983

[54] WIRE STRIPPING PLIERS

[76] Inventor: Roberto Casadio, Via di Barbiano, 10 Bologna, Italy

[21] Appl. No.: 192,970

[22] Filed: Oct. 2, 1980

[51] Int. Cl.³ .............................................. H02G 1/12
[52] U.S. Cl. .................................................. 81/9.5 A
[58] Field of Search ........................... 81/9.5 A, 9.5 R

[56] References Cited

U.S. PATENT DOCUMENTS

| | | | |
|---|---|---|---|
| 2,601,797 | 1/1952 | Holt, Jr. | 81/9.5 A |
| 3,087,363 | 4/1963 | Jacobs | 81/9.5 A |
| 3,125,908 | 3/1964 | Rozmus | 81/9.5 A |
| 3,776,069 | 12/1973 | Mugnier | 81/9.5 A |
| 4,112,791 | 9/1978 | Wiener | 81/9.5 A |

*Primary Examiner*—Roscoe V. Parker
*Attorney, Agent, or Firm*—Guido Modiano; Albert Josif

[57] ABSTRACT

Stripping pliers for stripping the sheath from insulated electric wires and cables comprises a first lever defining a handle and a jaw, a body articulated to the first lever and forming the second pliers jaw and a second handle defining lever pivoted on the body and effective to oscillate with respect to the first lever against the biasing of a spring. To the second lever there are articulated a pair of knife edges extending between the jaws and having cutting edges adapted for engaging the wire sheath at a position determining the sheath length to be stripped.

8 Claims, 6 Drawing Figures

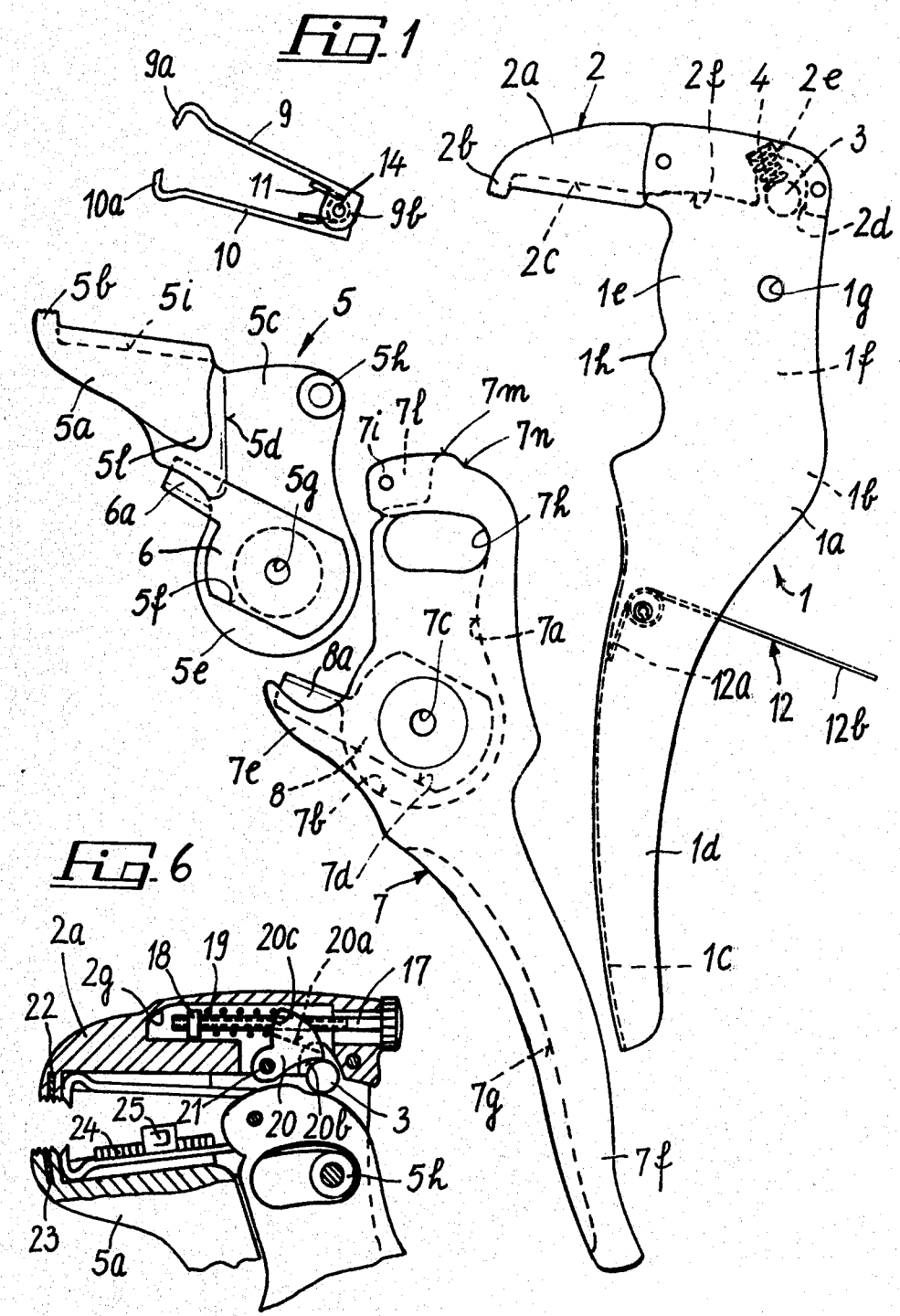

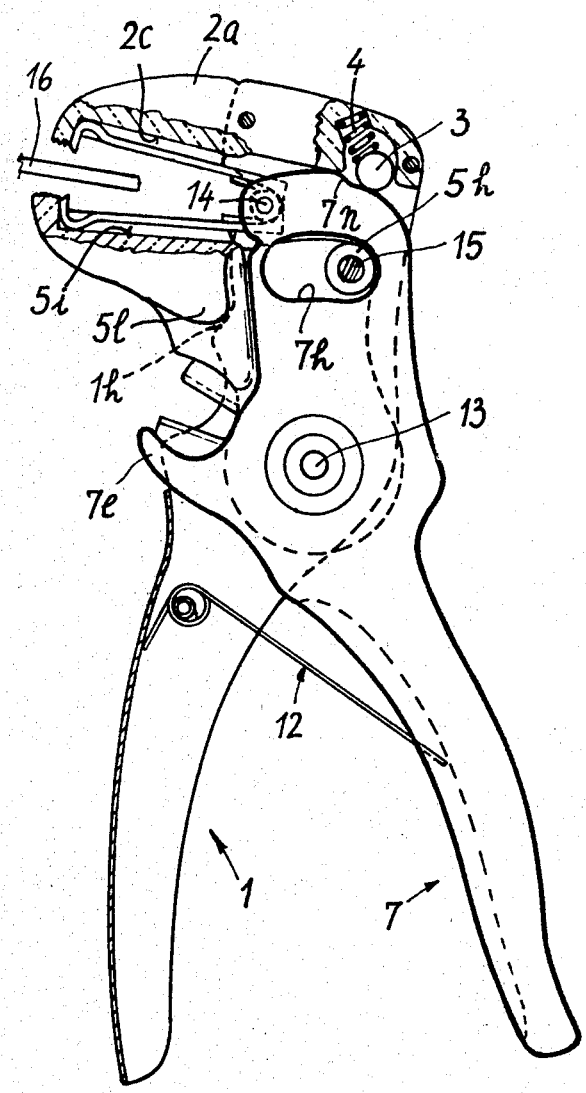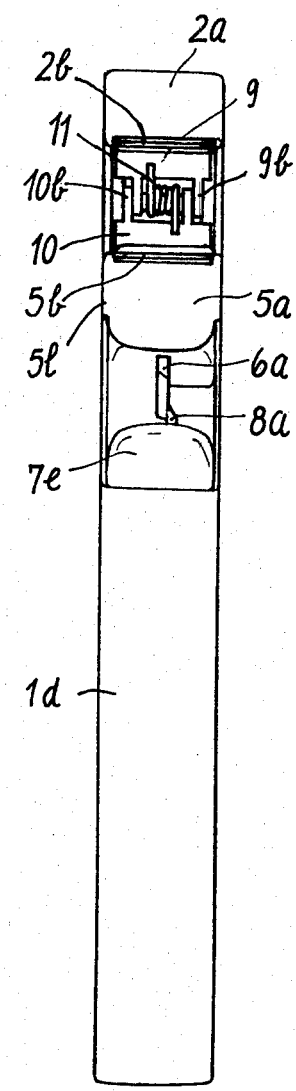

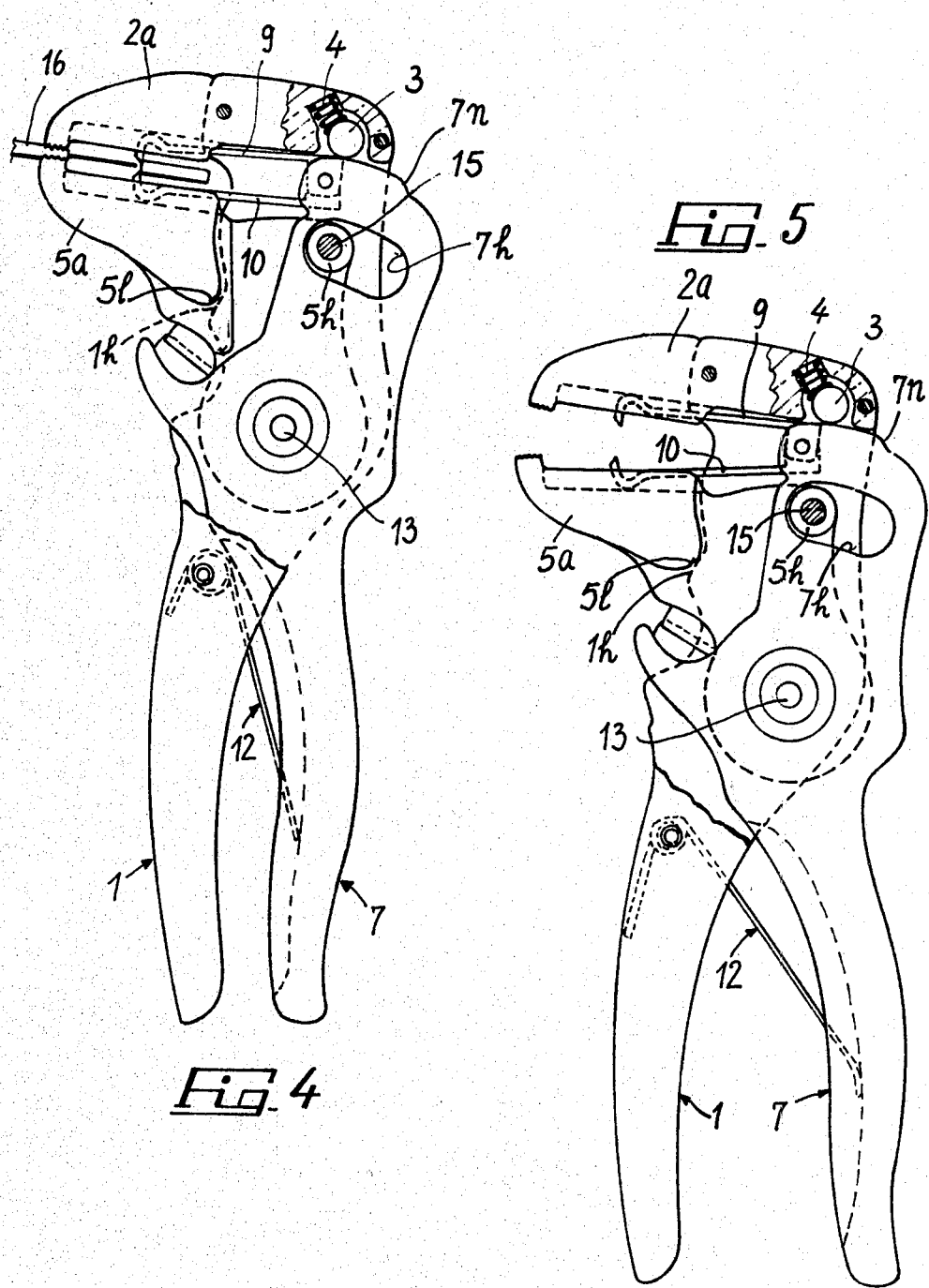

WIRE STRIPPING PLIERS

BACKGROUND OF THE INVENTION

This invention relates to wire or cable stripping or skinning pliers for removing the end portion of the insulating sleeve like coat from an electric conductor or cable.

Pliers of this general type are well known and currently marketed. They are intended for removing the end portion of the insulating sleeve like coat from an electric conductor in order to expose its metallic core and allow electrical connections to be carried out. Conventional pliers have some disadvantages, which reside mainly in the difficulty of effecting certain adjustments for adapting the pliers to the varying wire gauges, and which force the user to troublesome manipulations.

SUMMARY OF THE INVENTION

This invention sets out to provide wire or cable stripping or skinning pliers of novel design, which can obviate the drawbacks encountered with conventional stripping pliers and are extremely practical to use.

According to one aspect of this invention, there are provided wire sheath or cable coat stripping pliers for removing the end portion of a sheath or coat of an electric wire or cable, characterized in that said pliers comprise a first lever defining a handle and a jaw, a body articulated to said first lever and forming a second jaw cooperating with said first jaw to clamp one end of a wire to be stripped, a second lever articulated to said body and defining a second handle and oscillating with respect to said first lever against the bias of a return spring, to said second lever there being articulated a pair of knife edges extending between said jaws and having cutting edges adapted for engaging the wire sheath at a location determining the length to be stripped, said second lever being adapted to perform a rotational movement and having one portion thereof causing said jaws to contact the wire and clamp it at diametrically opposed locations and having another portion thereof producing a movement of said knife edges away from the area of engagement of said jaws and the separation and withdrawal of the sheath portion to be removed and engaged thereby.

BRIEF DESCRIPTION OF THE DRAWINGS

Further features of the invention will be more clearly apparent from the following detailed description of an embodiment thereof, illustrated by way of example only in the accompanying drawings, where:

FIG. 1 is an exploded view of the stripping pliers, showing the various component parts thereof in side elevation;

FIG. 2 is a side view of the pliers of FIG. 1 in open position;

FIG. 3 is a front view of the pliers;

FIG. 4 is a side elevational view of the pliers in closed position;

FIG. 5 is a side elevation view of the pliers in condition of return to the situation shown in FIG. 1; and FIG. 6 illustrates a modification of the stripping pliers.

DESCRIPTION OF THE PREFERRED EMBODIMENTS

With reference to FIGS. 1,5, the wire or cable stripping pliers according to this invention comprise a first lever 1 obtained from die-cut sheet metal folded over a symmetry line such as to define two faces 1a and 1b which are interconnected by a bridge portion 1c. The lever 1 further comprises a handle 1d of arcuate shape and having a U-like cross-sectional configuration which opens towards the pliers inside and comprising two flat leg portions 1e,1f with a shaped contour. Between the upper or top ends of the leg portions 1e,1f there is secured an element 2 forming an extension 2a which defines a jaw 2b at its free end. Extending from the jaw 2b towards the opposite end is a flat groove 2c which terminates at the junction between the element 2 and flat leg portions 1e,1f. At that area of the element 2 which is interposed between the leg portions 1e,1f a transverse groove 2d is provided at the midpoint whereof a cylindrical recess 2e is provided. The groove 2d accommodates a roller 3 which is biased outwards from the groove 2d by a spring 4 accommodated in the recess 2e.

Arranged between the flat leg portions 1e,1f is a body 5 having an extension 5a which forms a jaw 5b. The latter is a mirror-like image of a jaw 2b. A portion 5c of smaller thickness is attached to the extension 5a such as to define a step 5d. The portion 5c has a circular lug 5e wherein a depression 5f is formed wherein a small plate 6 is inserted which defines a blade or knife edge 6a, partly embedded in the extension 5a. At the center of the circular lug 5e a hole 5g is provided for the passage therethrough of an aritculation pin for the body 5 designed to cooperate with an additional lever 7, to be described hereinafter. The body 5 is also articulated to the lever 1 by means of a pin inserted into the body 5 through a small bushing 5h which protrudes from the portion 5c. The extension 5a has, formed on its face next to the groove 2c, a flat groove 5i which extends from the jaw 5b towards the small bushing 5h and terminates at the step 5d.

The body 5 is coupled to the lever 7. To this end, the lever 7 is formed with a recess 7a having a shape matching the portion 5c, with a circular region 7b for receiving the lug 5d and crossed by a central hole 7c for the articulation pin of the body 5.

At the region 7b, there is formed a seat 7d for the insertion of a small metal plate 8 which defines a blade or knife edge 8a adapted for cooperating with the blade 6a and supported by an extension 7e, of beak-like shape, of the lever 7. The blades 6a and 8a form a cutter for cutting wires and the like.

The lever 7 defines a handle 7f having an arcuate shape which is substantially similar to that of the handle 1d and having on its inner side a groove 7g which extends over the entire length of the handle.

In the upper portion of the recess 7a, a slot 7h of arcuate shape is provided, which has its center of curvature at the hole 7c. The small bushing 5h engages in the slot 7h, thereby, once they are coupled together, the body 5 is enabled to complete an angular slipping travel with respect to the lever 7 as determined by the angular length of the slot 7h.

Above the slot 7h, there are two lobes 7a and 7l having an outer contour 7m, concentrical to the hole 7c, the contour 7m defining a cam 7n. The contour 7m is complementary to the inner surface 2f of the element 2 which is arranged between the portions 1a and 1b of the lever 1. Advantageously, the contour 7m skims the surface 2f such that the roller 3, under the thrust by the spring 4, remains in tangent contact with the contour 7m without moving out of the groove 2c.

Journaled between the lobes 7a and 7l, are two knife edges 9,10, the ends whereof are bent toward each other to form opposed cutting edges 9a, 10a. At their opposite ends, the knives 9,10 are provided with wings 9b,10b (see FIG. 3), in number of two for each knife. The wings 9b, 10b are crossed by a hole for the introduction of a mutual articulation pin. A spring 11, of the pigtail type, urges the knives away from each other. The spring 11 is crossed by the articulation pin of the knives and acts, with its opposed ends, on the inner faces thereof. The knives 9,10 have a width dimension such that they can be accommodated in the grooves 2c and 5i.

Said pliers comprise further a spring 12, articulated to the lever 1 at the handle and having a portion 12a for engagement on the bridge 1c and a portion 12b. When the pliers are assembled, the portion 12b engages in the groove 7g of the handle 7f. The pliers just described are assembled in the following manner. First of all, (see FIG. 2) the body 5 is hingedly connected to the lever 7 by means of a pin 13 led through the holes 5g and 7c, while taking care to have the small bushing 5h engaged into the slot 7h. Then the knives 9,10 are articulated between the lobes 7i and 7l by means of a pin 14 led through the wings 9b, 10b and the lobes 7i and 7l and the spring 11.

The parts, so assembled, should be inserted between the portions 1a, 1b of the lever 1 and joined to the latter by means of a pin 15 led through the small bushing 5h and a hole 1g in the lever 1 (FIG. 1), taking care to arrange the portion 12b of the spring 12 into the groove 7g and the knives 9,10 into the grooves 2c, 5i.

Thus the body 5 is articulated to the lever 1 by means of the pin 15 and to the lever 7 by means of the pin 13.

In the inoperative condition of the pliers, as shown in FIG. 2, owing to the spring 12, the extensions 2a and 5a are spaced apart from each other with the body 5 having the small bushing 5h thereof resting on the inner edge of the slot 7h. The stop position of the extension 5a with respect to the extension 2a is determined by side embossments 51 of the extension 5a abutting against projections 1h of the portions 1e, 1f.

The desired sheath or sleeve like coat portion is removed from an electric cable 16 by placing the end of the wire between the jaws 2b, 5b for the length to be stripped and then acting on the handles 1d and 7f. Upon the action on the handles first the roller 3 engages the cam 7n which prevents the lever 7 from rotating with respect to the body 5, to allow the jaws 2b,5b to close onto the cable coat while the cutting edges 9a, 10a cut through the coat. It should be noted in this respect that the cutting edges 9a, 10a protrude slightly from the respective jaws to allow the cutting of the coat to occur simultaneously with the clamping of the jaws, but without cutting the metal core of the cable. The penetration of the cutting edges is ensured by the elasticity of the cable at the areas of compression of the jaws, even if the cutting edges do not protrude. A further closing movement of the handles 1d,7f, while the body 5 is locked on the cable by the jaws resting on the cable, causes the roller 3 to run over the cam 7n and be pushed into the groove 2d thereby to permit the lever 7 to rotate with respect to the body 5.

Consequently, the cutting edges 9a, 10a of the knives 9,10 are moved away from the jaws 2b,5b and the end portion of the coat is severed and removed as illustrated in FIG. 4.

On releasing the handles 1d,7f, the jaws are opened and release the cable and allow the knives to resume their original position. At the same time the roller 3, after rolling along the contour 7m, moves over the back of the cam 7n.

The succession of the cable gripping movement and the skinning movement of the final portion of the coat is ensured by the roller 3 engaging the cam 7n to oppose the rotation of the lever 7 with respect to the body 5 until the effort required to overcome the cam 7n reaches a value corresponding to an effective clamping action of the jaws and cutting action of the cutting edges 9a,10a into the coat. To adjust the effort for the roller 3 to overcome the cam 7n, and therefore the clamping action of the jaws, there is provided a device which allows the elastic bias of the roller 3 to be adjusted, said bias, in the embodiment of FIGS. 1–5, being constant and represented by the spring 4.

As shown in FIG. 6, the device comprises a screw 17 which extends into a recess 2g in the element 2 and on which a nut 18 is threaded which is guided into the recess such that it cannot turn but is allowed to slide. The nut 18 acts as a shoulder for a spring 19 overlying the screw 17 and acting on a rocking member 20 articulated to a pin 21.

The member 20 has a slot 20a which extends in a plane perpendicular to the pin 21 to allow the passage therethrough of the screw 17, and two faces 20b and 20c. The face 20b rests on the roller 3, whilst on the face 20c acts on the spring 19. It will be apparent that, by acting on the screw 17, it is possible to compress to a greater or lesser degree the spring 19 and adjust its thrust exerted by the spring 19 against the member 20 and accordingly on the roller 3.

If the parts 2 and 5 are made of a plastics material, to make the jaws 2b and 5b more wear resistant, it is possible to embed therein metal blades 22,23.

Finally, to adjust the length of the end portion of the cable coat to be removed there is attached to the lower knife 10 a rib 24 wherealong a slider 25 is slidable which functions as a detent for the cable end. To select the position of the slider 25 on the rib 24, the latter is provided, along one side, with teeth engageable with corresponding projections of the slider.

I claim:

1. Wire stripping pliers for removing the end portion of a sleeve of an electric wire or cable, characterized in that said pliers comprise a first lever defining a handle and a jaw, a body articulated to said first lever and forming a second jaw cooperating with said first jaw to clamp one end of a wire to be stripped, a second lever articulated to said body and defining a second handle and oscillating with respect to said first lever against the bias of a return spring, to said second lever there being articulated a pair of knife edges extending between said jaws and having cutting edges adapted for engaging the wire sheath at a location determining the length to be stripped, said second lever being adapted to perform a rotational movement and having one portion causing said jaws to contact the wire and clamp it at diametrically opposed locations and another portion producing a movement of said knife edges away from the area of engagement of said jaws and the separation and withdrawal of the sheath portion to be removed and engaged thereby.

2. Pliers according to claim 1, characterized in that in the jaw of said first lever there is formed a transverse groove accommodating a roller, said roller being biased by a spring toward the top of said second lever, said second lever top having a cam for engagement by said roller and such as to hinder the rotation of said second lever before the jaws and knife edges have effectively engaged the wire sheath.

3. Pliers according to claim 2, characterized in that they comprise a device for varying the elastic bias of said spring on said roller, said device including an adjustment screw extending into a recess in the jaw of said first lever and whereon a rotatively restrained nut is threaded, said nut being slidable in said recess and acting as an abutment shoulder for a spring arranged to act on said roller with the interposition of a prismatic member journaled in said jaw.

4. Pliers according to claim 1, characterized by a rib attached to one knife edge, whereon a slider can be positioned, said slider acting as a detent for the wire end.

5. Pliers according to claim 1, characterized in that in said jaws, at the area of engagement with said sheath, there are inserted metal blades.

6. Pliers according to claim 1, characterized in that said body has a small bushing therethrough which axially passes a pin for the articulation of said first lever, said small bushing being in engagement with a slot in said second lever, said slot extending concentrically to the articulation point of said body to said second lever.

7. Pliers according to claim 1, characterized in that said knife edges are guided in grooves in said jaws.

8. Pliers according to claim 1, characterized in that in said body and second lever there are formed depressions intended for accommodating metal plates, said metal plates defining blades and being articulated to each other at the pivot point between said body and said second lever, such that the blades form a sort of cutter for cutting wires and the like.

* * * * *